United States Patent
Bosch et al.

(10) Patent No.: US 11,470,189 B2
(45) Date of Patent: Oct. 11, 2022

(54) NETWORK STACK FOR A PLURALITY OF PHYSICAL COMMUNICATION INTERFACES

(71) Applicants: IMEC VZW, Leuven (BE); UNIVERSITEIT ANTWERPEN, Antwerp (BE)

(72) Inventors: Patrick Daniel Bosch, Leuven (BE); Tom Johan R De Schepper, Leuven (BE); Ensar Zeljkovic, Leuven (BE); Jeroen Maurice M Famaey, Leuven (BE); Steven Bert Latre, Leuven (BE)

(73) Assignees: IMEC VZW, Leuven (BE); UNIVERSITEIT ANTWERPEN, Antwerp (BE)

( * ) Notice: Subject to any disclaimer, the term of this patent is extended or adjusted under 35 U.S.C. 154(b) by 36 days.

(21) Appl. No.: 16/613,321

(22) PCT Filed: May 14, 2018

(86) PCT No.: PCT/EP2018/062390
§ 371 (c)(1),
(2) Date: Nov. 13, 2019

(87) PCT Pub. No.: WO2018/210755
PCT Pub. Date: Nov. 22, 2018

(65) Prior Publication Data
US 2020/0204659 A1    Jun. 25, 2020

(30) Foreign Application Priority Data
May 15, 2017  (EP) ..................... 17171131

(51) Int. Cl.
*H04L 69/321* (2022.01)
*H04L 47/125* (2022.01)
(Continued)

(52) U.S. Cl.
CPC .......... *H04L 69/321* (2013.01); *H04L 47/125* (2013.01); *H04L 47/34* (2013.01);
(Continued)

(58) Field of Classification Search
None
See application file for complete search history.

(56) References Cited

U.S. PATENT DOCUMENTS

2001/0032232 A1* 10/2001 Zombek .................. H04L 67/01
709/201
2006/0133371 A1* 6/2006 Matoba ............... H04L 67/1001
370/389
(Continued)

OTHER PUBLICATIONS

European Search Report from corresponding EP Application EP 17171131.0, dated Jul. 13, 2017.
(Continued)

*Primary Examiner* — Andrew C Oh
(74) *Attorney, Agent, or Firm* — Workman Nydegger (57) ABSTRACT

A method is disclosed for providing network access by a network stack in a communication device comprising a plurality of physical communication interfaces, each comprising a data link layer for the exchange of data frames with remote communication devices and a data link layer interface for exchanging data of data frames between the data link layer and higher layers in the network stack; and wherein the method comprises i) providing an abstraction data link layer comprising a single abstracted data link layer interface such that the plurality of physical communication interfaces appear as a single data link layer interface to the higher layers; and ii) obtaining network packets from the higher layers and distributing the network packets over the plurality of physical communication interfaces according to a neutral packet distribution scheme.

18 Claims, 6 Drawing Sheets

(51) Int. Cl.
    *H04L 47/34* (2022.01)
    *H04L 69/326* (2022.01)
    *H04W 36/00* (2009.01)
    *H04W 84/18* (2009.01)
    *H04L 67/56* (2022.01)

(52) U.S. Cl.
    CPC ............ *H04L 67/56* (2022.05); *H04L 69/326* (2013.01); *H04W 36/0005* (2013.01); *H04W 84/18* (2013.01)

(56) References Cited

U.S. PATENT DOCUMENTS

| | | | |
|---|---|---|---|
| 2006/0248194 A1* | 11/2006 | Ly | H04L 67/2876 709/226 |
| 2009/0019505 A1* | 1/2009 | Gopalakrishnan | H04L 1/1838 725/109 |
| 2010/0118869 A1* | 5/2010 | Li | H04L 69/167 370/389 |
| 2010/0205313 A1* | 8/2010 | Boire-Lavigne | H04L 65/1069 709/228 |
| 2011/0026403 A1* | 2/2011 | Shao | H04L 67/1001 370/235 |
| 2011/0040892 A1* | 2/2011 | Amemiya | H04L 67/1027 709/235 |
| 2011/0103347 A1* | 5/2011 | Dimou | H04W 36/30 370/331 |
| 2011/0292921 A1* | 12/2011 | Hunter | H04L 45/74 370/392 |
| 2013/0002409 A1* | 1/2013 | Molina | H04B 3/542 340/12.32 |
| 2013/0003874 A1* | 1/2013 | Abad Molina | H04B 3/544 375/257 |
| 2013/0003879 A1* | 1/2013 | Balleste | H04W 36/14 375/257 |
| 2013/0007855 A1* | 1/2013 | Bennett | H04B 3/54 726/5 |
| 2013/0185451 A1 | 7/2013 | Gelter | |
| 2013/0239150 A1* | 9/2013 | Chen | H04L 5/0044 725/62 |
| 2013/0331094 A1* | 12/2013 | Egan | H04W 88/06 455/426.1 |
| 2014/0169383 A1* | 6/2014 | Jain | H04L 47/624 370/412 |
| 2014/0233576 A1* | 8/2014 | Vazquez | H04L 49/25 370/400 |
| 2014/0286220 A1* | 9/2014 | Folkmanis | H04L 12/1868 370/312 |
| 2015/0113138 A1* | 4/2015 | Bahr | H04W 12/06 709/225 |
| 2015/0127837 A1* | 5/2015 | Harashima | H04L 67/63 709/227 |
| 2015/0199946 A1* | 7/2015 | Kato | H04N 7/15 348/14.12 |
| 2015/0215831 A1* | 7/2015 | Jung | H04W 36/0085 370/332 |
| 2015/0350064 A1* | 12/2015 | Kano | H04L 45/02 370/389 |
| 2015/0382274 A1* | 12/2015 | Logvinov | H04L 47/13 370/311 |
| 2016/0014021 A1* | 1/2016 | Li | H04L 45/50 370/389 |
| 2016/0026592 A1* | 1/2016 | Ganth | G06F 9/45558 710/306 |
| 2016/0156512 A1 | 6/2016 | Pope | |
| 2016/0191522 A1* | 6/2016 | Liang | H04L 67/10 713/168 |
| 2017/0005935 A1* | 1/2017 | Tao | H04L 67/1002 |
| 2017/0039144 A1* | 2/2017 | Wang | G06F 12/0875 |
| 2017/0041841 A1* | 2/2017 | Pedersen | H04W 36/0072 |
| 2017/0126516 A1* | 5/2017 | Tiagi | H04L 69/22 |
| 2017/0331753 A1* | 11/2017 | Li | H04L 47/27 |
| 2018/0287935 A1* | 10/2018 | Wang | H04L 12/4625 |
| 2019/0394121 A1* | 12/2019 | Wang | H04L 43/16 |

OTHER PUBLICATIONS

Partial European Search Report from corresponding EP Application EP 17171131.0, dated Jul. 20, 2017.
International Search Report and Written Opinion from corresponding PCT Application PCT/EP2018/062390, dated Aug. 1, 2018.

* cited by examiner

NETWORK STACK FOR A PLURALITY OF PHYSICAL COMMUNICATION INTERFACES

FIELD OF THE INVENTION

The present invention generally relates to, amongst others, a method for providing network access by a network stack in a communication device comprising a plurality of physical communication interfaces.

BACKGROUND OF THE INVENTION

Nowadays, most communication devices comprise several different communication interfaces for exchanging data with a remote device. One example is a smartphone that has a cellular interface and a Wi-Fi interface wherein the Wi-Fi interface may even be simultaneously operable in the 2.4 GHz and 5 GHz frequency band. Applications running on these communication devices are then offered access to these communication interfaces by the network or protocol stack. For example, an application can communicate over a wired or wireless interface by opening a network socket on which turn the network stack establishes a TCP/IP network connection with the remote communication device.

A general problem with the above network stack layout is that the application itself is responsible for the management of different connections over different physical interfaces. For example, when a device is out of reach of a WLAN access points, its socket will be closed and it will need to open a new socket to re-establish network access over another physical interface, for example the cellular interface.

Different solutions exist that implement a less complex application interface to the network stack while maintaining the flexibility of the different physical communication interfaces.

One solution is multi-path TCP or shortly MPTCP, an extension to the TCP network protocol of which a first version was released by the Engineering Task Force's (IETF) Multipath TCP working group in RFC 6824. A network stack supporting MTCP can offer a single network socket that abstract multiple TCP connections. While the network socket and thus the TCP connection is maintained, links may be added or dropped while a user moves in or out network coverage. This is done by the addition of an extra abstraction layer at the transport layer while leaving the network or link level unchanged.

One problem with MPTCP is that both the connection endpoints must support the protocol to benefit from the multi-path capabilities. Moreover, it does not allow to exploit multi-path capabilities between intermediate networking nodes.

Another solution is offered by the addition of an abstraction layer between the data link layer and network layer as specified in the IEEE 1905.1 standard. This abstraction layer is provided with a unique EUI-48 address, i.e., a specific implementation of a MAC address, to identify a 1905.1 device. This MAC address is then used as a persistent address when multiple interfaces are available each having their own MAC address. The IEEE 1905.1 does not specify forwarding rules for the exchange of data between the data link layer and the higher networking layer but merely specifies a list of primitives to manage the forwarding rules based on a classification of the different data flows, i.e., the data is forwarded based on MAC source and destination address, based on the Ethertype, i.e, the encapsulated protocol, based on the VLAN ID, i.e., the IEEE 802.1Q virtual LAN identification and based on the Priority Code Point (PCP), i.e., a IEEE P802.1p Quality of Service indication.

The IEEE 1905.1 standard still poses different problems. First, it is limited to a selection of standards: IEEE 802.11 (Wi-Fi), IEEE 1901 (HomePlug, HD-PLC) powerline networking, IEEE 802.3 Ethernet and Multimedia over Coax (MoCA). Second, forwarding rules are not defined and, when implemented, based on flow control which, on its turn, requires interaction and, thus, detailed knowledge of the underlying MAC protocols. Furthermore, flow-based forwarding rules are not optimal for performing load balancing on communication channels that have dynamically changing throughputs.

SUMMARY OF THE INVENTION

It is an object of the present invention to solve the above identified problems and to provide, among others, a network stack that abstracts the different physical communication interfaces from an application while supporting a wide variety of different data link layer protocols and supporting forwarding schemes that are more suited for dynamically changing wireless environment.

This object is achieved, according to a first aspect, by method for providing network access by a network stack in a communication device comprising a plurality of physical communication interfaces; and wherein, for each physical communication interface, the network stack comprises a data link layer for the exchange of data frames with remote communication devices and a data link layer interface for exchanging data of data frames between the data link layer and higher layers in the network stack. The method comprises the following steps:

providing an abstraction data link layer operable with each data link layer and comprising a single abstracted data link layer interface such that the plurality of physical communication interfaces appear as a single data link layer interface to the higher layers;

obtaining network packets from the higher layers and distributing the network packets over the plurality of physical communication interfaces according to a neutral packet distribution scheme.

A physical communication interface corresponds to a communication means that interacts with a wired or wireless communication channel. Physical communication interfaces exchange communication signals according to a physical layer protocol, i.e., a PHY protocol. The data link layers then provides a data link layer interface on top of the PHY layer such that devices can exchange data over the communication channel with a device at the other end of the communication channel without knowledge of the actual underlying PHY protocol. The abstraction data link layer sits on top of a set of data link layers, for example in a similar way as the abstraction layer according to the IEEE 1905.1 standard. The higher layer may then correspond to a network layer such as the Internet Protocol, a transport layer such as TCP or UDP and an application layer.

The abstraction layer further implements a specific packet forwarding scheme for forwarding packets from the network layer to one or more of the data link layers. The forwarding scheme is a neutral packet distribution scheme which may also be referred to as a packet independent distribution scheme. In such a distribution scheme, there is no specific knowledge on the packets needed at the abstraction layer itself, for example, the abstraction layer does not have any knowledge on the destination of the packet, the quality of service requirements of the packet or the underlying protocol used. This has the advantage that the abstraction layer can be applied to a greater range of underlying technologies and, when applied, much less integration effort is required because the knowledge of the underlying data link layer protocols can be kept to a minimum. Furthermore, packet distribution can be applied at the packet level, i.e., forwarding rules are applied to each packet independently and are not restricted to a group or set of packets. This allows for a much finer grained distribution of the packets and, thus, for a much better control over the traffic on the underlying communication channels.

According to an embodiment, the packet neutral distribution scheme corresponds to a probabilistic load balancing scheme.

In a probabilistic load balancing scheme, the network packets from the higher network layer are distributed among the different communication interfaces according to a predefined load balancing scheme such that each interface receives a predefined percentage of the total amount of network packets.

This has the advantage that load balancing can be applied at a very fine granularity and controlled or adjusted at any moment in time. This further allows to spread the network load depending on the throughput capacity of the underlying physical interfaces.

Alternatively, the packet neutral distribution scheme corresponds to a rule-based load balancing scheme. According to such a scheme, every packet is checked against a predefined rule. For example, when the packet size is smaller than a predefined threshold, it is forwarded to a first physical communication interface, otherwise it is forwarded to a second physical communication interface.

According to an embodiment, the packet neutral distribution scheme corresponds to a time division multiple access scheme.

A time division multiple access scheme or shortly TDMA scheme, distributes the network packets over the different interfaces according to predefined time slots that are assigned to each interface. This is particular advantageous when physical communication interfaces correspond are wireless communication interfaces which share a same wireless communication channel. In such a case, the network packets obtained from the higher layers are distributed over the wireless communication interfaces according to the time division multiple access scheme such that both physical interfaces share the same communication channel without interference.

The advantage of this is that interference between different communication standards that use the same frequency can be reduced to a minimum thereby achieving an optimal throughput for each of the standards.

The neutral packet distribution scheme may further be received from a remote network controller. This way, the intelligence in the communication device itself is kept to a bare minimum and the distribution scheme within various devices may optimized over a whole network that implements communication according to different standards.

According to an embodiment, the method further comprises, by the abstraction data link layer:
    receiving packets from a remote communication device over the plurality of physical communication interfaces; and
    reordering the packets to an initial packet sequence; and providing the reordered packets to the higher layers.

This embodiment describes the situation where networking packets are received from the different data link layers. As the same kind of neutral packet distribution schemes may be applied at the other end of the communication link, packets may arrive out of order. Therefore, a reordering is performed such that the initial packet sequence is restored.

In addition, the packet neutral distribution scheme may further comprise a packet replication scheme and the method further comprises, by the abstraction data link layer, replicating all network packets from the higher layers over at least two of the plurality of physical communication interfaces.

This allows establishing a more secure link when one or more of the physical interfaces are unreliable.

In the other way, when receiving a replicated frame from one of the plurality of physical communication interfaces, the method further comprises identifying the replicated frame as a replication of a previously received frame and removing the replicated frame.

According to an embodiment the method further comprises, by the abstraction data link layer:
    receiving a packet from a first one of the plurality of physical communication interfaces; and
    routing the packet from the first one of the plurality of physical communication interfaces to a second one of the plurality of physical communication interfaces according to a multi-hop routing table.

The multi-hop routing table may for example be received from a remote network controller and allows establishing a mobile ad hoc network over different wireless standards.

According to an embodiment, the method further comprises, by the abstraction data link layer:
    receiving a handover command from a remote network controller for performing a handover from a first physical communication interface of the plurality of physical communication interfaces to a second physical communication interface of the plurality of physical communication interfaces between the communication device and a second remote communication device; and
    sending a first minimum amount of time for performing the handover to the second remote communication device; and
    receiving from the second remote communication device a second minimum amount of time for performing the handover by the second remote communication device; and
    performing the handover; and
    after at least the largest of the first and second minimum amount of time resuming communication with the second remote communication device over the second physical communication interface.

This way a handover can be established between two different communication standards that even use the same communication channel, e.g., the same frequency band. The communication standards themselves do not have to support the handover sequence while the handover stays invisible and, thus, seamless for the network layer.

The method may then further comprise, by the abstraction data link layer:
    negotiating with the second remote communication device on a starting time for the handover; and
    performing the handover on the starting time.

According to example embodiments, the plurality of physical communication interfaces are connected to a communication network comprising an addressable proxying service. The method then further comprises, by the abstraction data link layer:
    replacing the destination address of the network packets by a network address of the proxying service; and sending the network packets to the proxying service for further relaying to a destination node by the further distributing the network packets over the plurality of physical communication interfaces according to the neutral packet distribution scheme.

Hence, the abstraction layer provides a single networking interface to the upper layers of the networking device while providing multiple paths up to the proxying service. Furthermore, the end node will experience a single network connection from proxying service by a single networking interface. Therefore, the multiple paths between the device and proxying service remain invisible to the end node. Moreover, the end node does not need to support any of the abstraction layer logic. A further advantage is that the networking and transport layer of the protocol stack see a single networking interface. Therefore, the above method is applicable to various network and transport protocols in contrast to multi-path network protocol solutions such as multipath TCP (MTCP).

To ensure a robust connection between abstraction data link layer and the proxying service, the method may further comprise, by the abstraction data link layer:

initializing, for a transport layer protocol of the network packets, over the respective physical communication interfaces, an intermediate connection with the proxying service; and providing the destination address of the network packets to the proxying service for the further relaying of the packets to a destination node.

The providing the destination address may for example be performed by incorporating the destination address of the destination node in a field of the network packets different than the destination address field.

Alternatively, the providing the destination address may be performed by sending the address of the public end node to the proxying service prior to the sending of the network packets.

According to a second aspect, the invention relates to a computer program product comprising computer-executable instructions for performing the method according to the first aspect when the program is run on a computer.

According to a third aspect, the invention relates to a computer readable storage medium comprising the computer program product according to the second aspect.

According to a fourth aspect, the invention relates to a data processing system programmed for carrying out the method according to the first aspect.

DETAILED DESCRIPTION OF EMBODIMENT(S)

Figure 1:
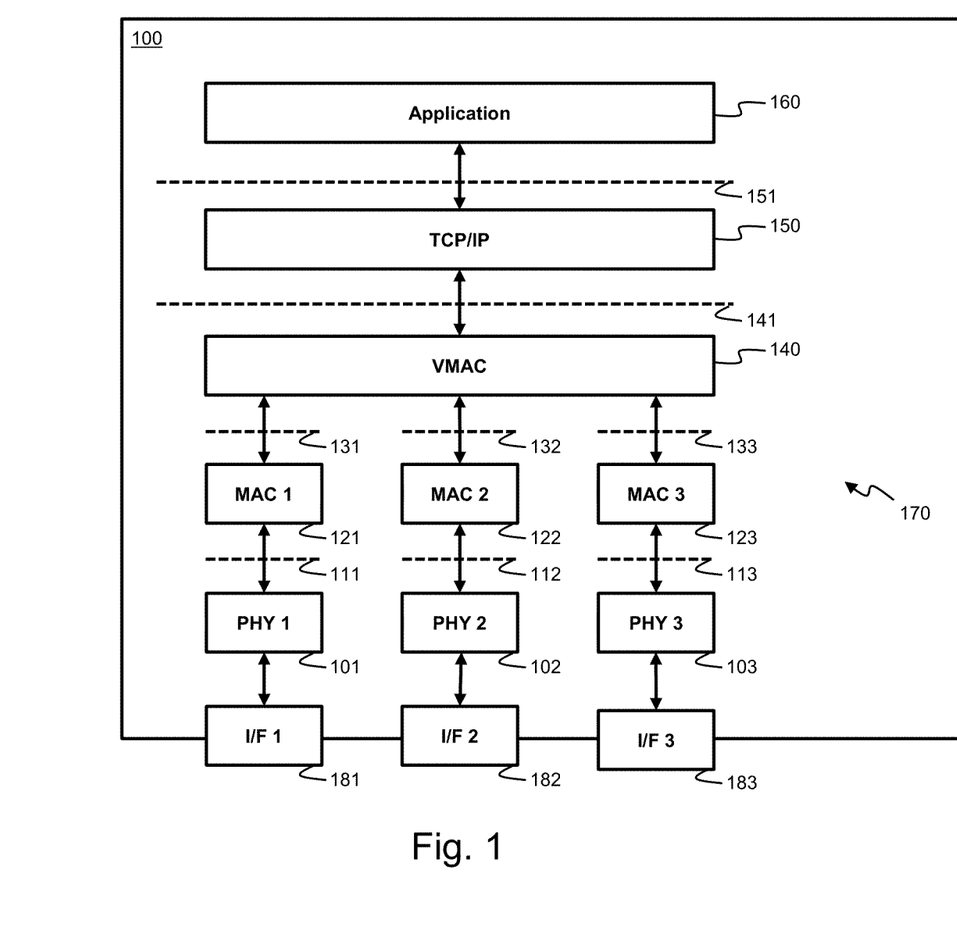
FIG. 1 illustrates a communication device with a plurality of physical communication interfaces and a network stack according to an embodiment of the invention.

FIG. 1 illustrates a communication device 100 according to an embodiment of the invention. Device 100 comprises a plurality of communication interfaces 181, 182 and 183. Each communication interface allows communication between device 100 and a remote communication device over a communication channel to which the communication interface is connected. The communication channel may run over a wired or wireless communication medium. In order to provide communication over these interfaces 181, 182 and 183 to an application running on device 100, the device further comprises a network or protocol stack 170. The network or protocol stack 170 may be implemented fully or partially in hardware and/or software within device 100. Network stack 170 is logically divided into a stack of layers, each performing a separate function of one or more of the OSI layers as defined by ISO/IEC 7498-1.

At the lowest layer, closest to the communication interface, the software stack 170 comprises for each interface 181, 182, 182 a physical layer 101, 102, 103 with thereon a data link layer 121, 122, 123. The data link layer further comprises at least the medium access control sublayer or, shortly, MAC sublayer. The MAC and PHY layers may for example be operable according to any one of the IEEE 802 standards. The MAC layer may for example correspond to an IEEE 802.3 Ethernet MAC layer, an IEEE 802.11 Wi-Fi MAC layer or IEEE 802.15.4 ZigBee MAC layer with any of the suitable PHY layers as defined under the IEEE 802 standards. Between the MAC and PHY layer, frames are exchanged over the respective interfaces 111, 112, 113. In the same way, MAC layers 121, 122 and 123 exchange network packets with the layer 140 above by respective interfaces 131, 132, 133.

Network stack 170 further comprises an abstracted data link layer 140 on top of at least two of the data link layers 121, 122, 123. In FIG. 1, the abstracted data link layer 140 covers all data link layers 121, 122, 123. Abstracted data link layer 140 operates according to a configurable distribution scheme for the exchange of data between the higher network layer and transport layer 150. The distribution scheme defines the rules for how packets from the network layer 150 are forwarded to the different data link layers 121, 122, 123 and vice versa. Abstracted data link layer 140 is presented as a single data link layer interface 141 to network layer 150, i.e., layer 140 abstracts the physical interfaces 181, 182, 183 from the network and application layers 150 and 160.

Protocol stack 150 further comprises a network and transport layer 150, for example a TCP/IP layer 150 thereby turning network stack 170 into an Internet Protocol stack or, shortly, IP stack. TCP/IP layer 150 may then further interface with a higher application layer 160 through interface 151, for example by offering access to the network layer 150 in the form of a network socket.

Figure 2:
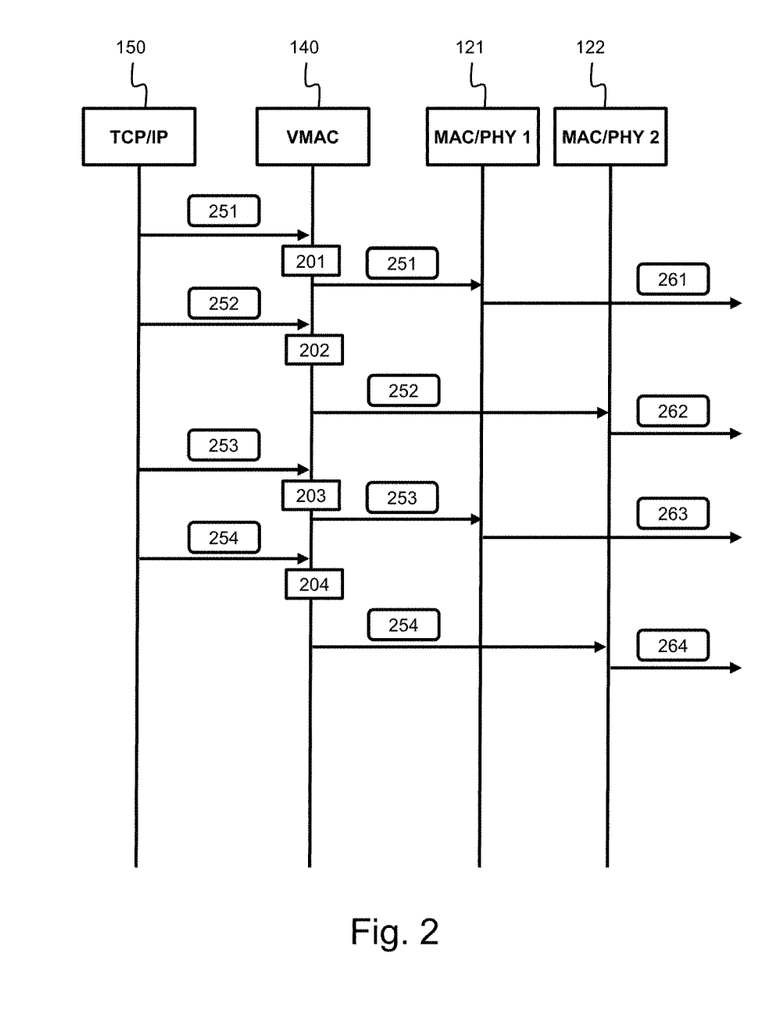
FIG. 2 illustrates steps performed by different layers of a network stack for performing load balancing according to an embodiment of the invention.

FIG. 2 illustrates steps performed by the various layers 150, 140, 121 and 122 of the protocol stack 170 according to an embodiment of the invention. More precisely, FIG. 2 illustrates the operation of a probabilistic distribution scheme in the abstract data link layer 140 for the forwarding of network packets 251, 252, 253, 254 to the different data link layers 121, 122. According to the probabilistic distribution scheme, the abstract layer 140 is configured to forward each packet from network layer 150 to one of the data link layers according to a configurable probability. In the example of FIG. 2, this probability is set to 50% for layer 121 and 50% for layer 122 thereby achieving an equal load balancing of packets over the two data link layers 121, 122 and, thus, over the two communication interfaces 181 and 182. At a certain point in time, layer 251 receives a packet 251 from layer 150 which is to be communicated to a network layer of a remote communication device as specified by the addressing information in the packet 251. The distribution scheme of layer 140 then decides in step 201 to forward packet 251 to data link layer 121, which results in the transmission of packet 261 over the communication interface 181. When the next packet 252 arrives at layer 140, it is forwarded in step 202 to layer 122 by the distribution scheme in order to fulfil the 50-50% probabilistic distribution scheme. On its turn, packet 252 is transmitted over interface 182 as packet 262 by the PHY layer. In a similar way, network packet 253 and 254 are forwarded in respective steps 203 and 204 to layers 121 and 122 and transmitted over respective interfaces 181 and 182 as packets 263 and 264.

Other probabilistic load balancing schemes are also possible, with for example an unequal distribution or a distribution over more than two communication interfaces. The distribution scheme itself may be retrieved or received from a remote communication device, for example from a software defined network controller or, shortly, an SDN controller.

Alternatively, the packet neutral distribution scheme corresponds to a rule-based load balancing scheme. According to such a scheme, every packet is checked against a predefined rule. For example, when the packet size is smaller than a predefined threshold, it is forwarded to a first physical communication interface, otherwise it is forwarded to a second physical communication interface. This has the advantage that the load can be spread based on the packet size capabilities of the communication interface. For example, small packets may be send over an IoT-enabled technology, while bigger packets are sent over a broadband communication channel such as Wi-Fi. This way load balancing is achieved while avoiding further fragmentation in the MAC and PHY layer.

Figure 3:
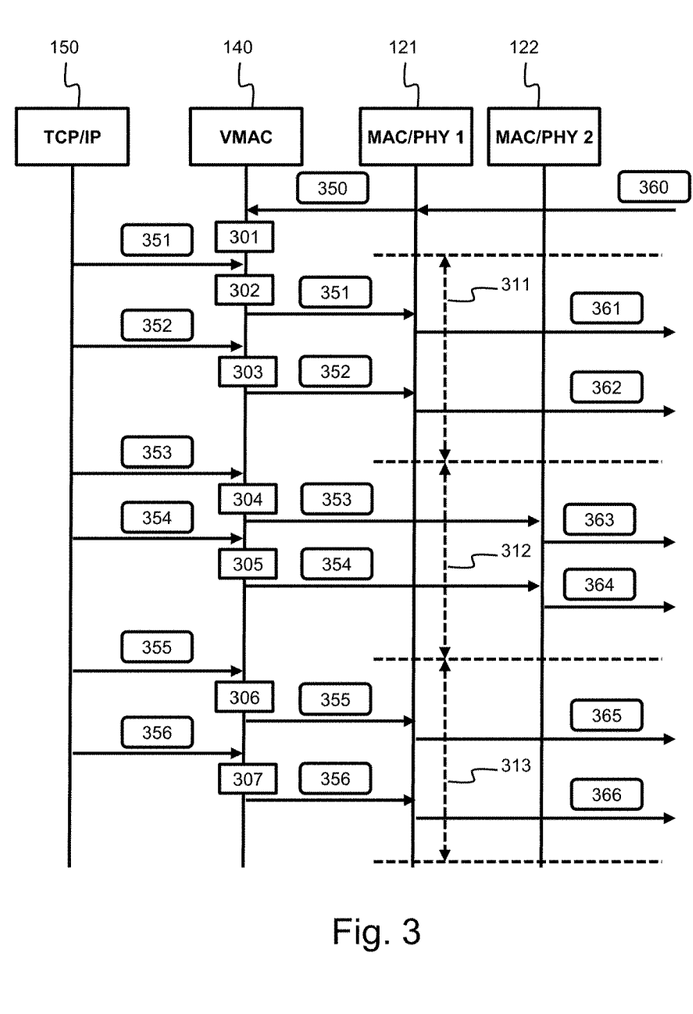
FIG. 3 illustrates steps performed by different layers of a network stack for performing shared channel access according to an embodiment of the invention.

FIG. 3 illustrates steps performed by the abstraction layer 140 of communication device 100 according to another embodiment of the invention. In this case, the packet distribution scheme is configured to operate according to a time division multiple access scheme or, shortly, a TDMA scheme. According to this scheme, each communication interface is assigned a time slot in which it may process packets from network layer 150. To this end, data link layers 121 and 122 are also assigned time slots 311, 312, 313 in which the abstraction layer 140 may forward packets to them. In the example of FIG. 3, data link layer 121 may only receive packets during time slots 311 and 313 and data link layer 122 may only receive packets in the remaining time slots, i.e., during time slot 312. Abstraction layer 140 will then forward network packets 351 and 352 in respective steps 302 and 303 to layer 121 during time slot 311 resulting in respective packets 361 and 362 that are transmitted over communication interface 181. Thereafter, abstraction layer 140 will forward network packets 353 and 354 in respective steps 304 and 305 to layer 122 during time slot 312 resulting in respective packets 363 and 364 that are transmitted over communication interface 182. Thereafter, abstraction layer 140 will forward network packets 355 and 356 in respective steps 306 and 375 to layer 121 during time slot 313 resulting in respective packets 365 and 366 that are transmitted over communication interface 181. The TDMA distribution scheme may further be received from a remote communication device such as a software defined network controller or, shortly, SDN controller. This is illustrated in FIG. 3 by the reception of the TDMA scheme with packet 360 at the communication interface 181. The data link layer 121 then provides the scheme as network packet 350 to the abstraction data link layer 140 which, on its turn, applies the TDMA distribution scheme in step 301.

Figure 4:
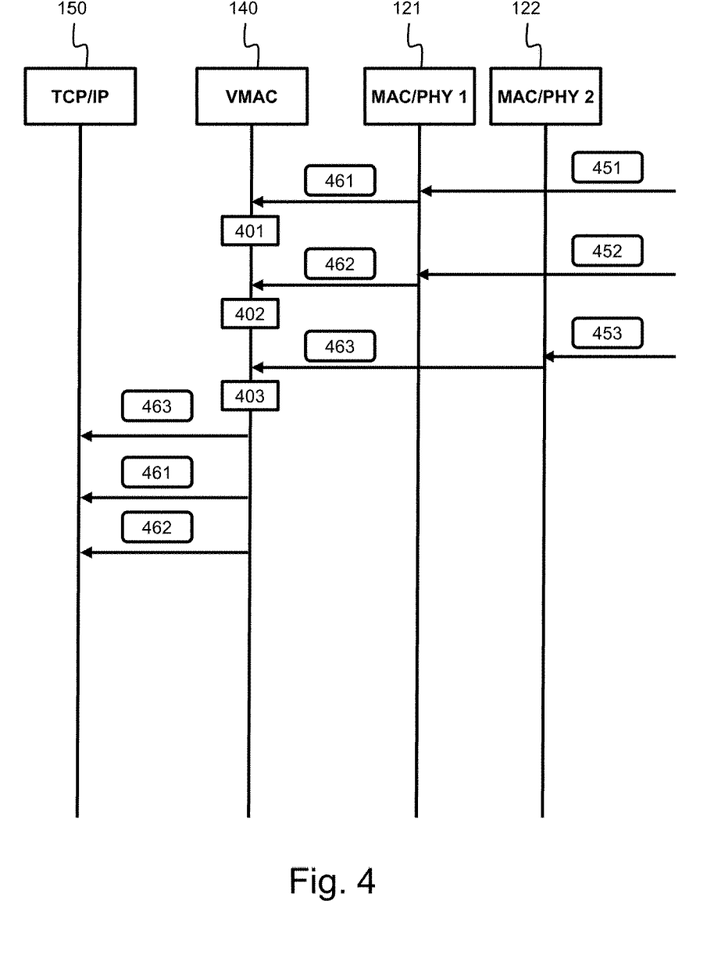
FIG. 4 illustrates steps performed by different layers of a network stack for reordering received packets according to an embodiment of the invention.

FIG. 4 illustrates steps performed by abstraction data link layer 140 when receiving packets 451, 452, 453 over the physical communication interfaces 181 and 182 and which are addressed to the higher layers 150 in the network stack 170. The received packets may have been transmitted by a communication device similar to device 100, i.e., which has transmitted these packets 451, 452, 453 by similar load balancing schemes or TDMA schemes as illustrated in FIGS. 2 and 3. As different packets of a same data flow may be sent over different physical communication interfaces, the packets may arrive at device 100 out of order. Because the different communication interfaces 181, 182 operate independently, there is no mechanism to correct this issue. Therefore, abstraction data link layer 140 performs a reordering on received packets. For example, when network packets 461, 462, 463 are received, the abstraction layer 140 checks the order of the packets in respective steps 401, 402, 403. If packets are out of order, then abstraction layer 140 reorders the packets and forwards them in the correct order, i.e., first 463, then 461, then 462, to the network layer 150.

Figure 5:
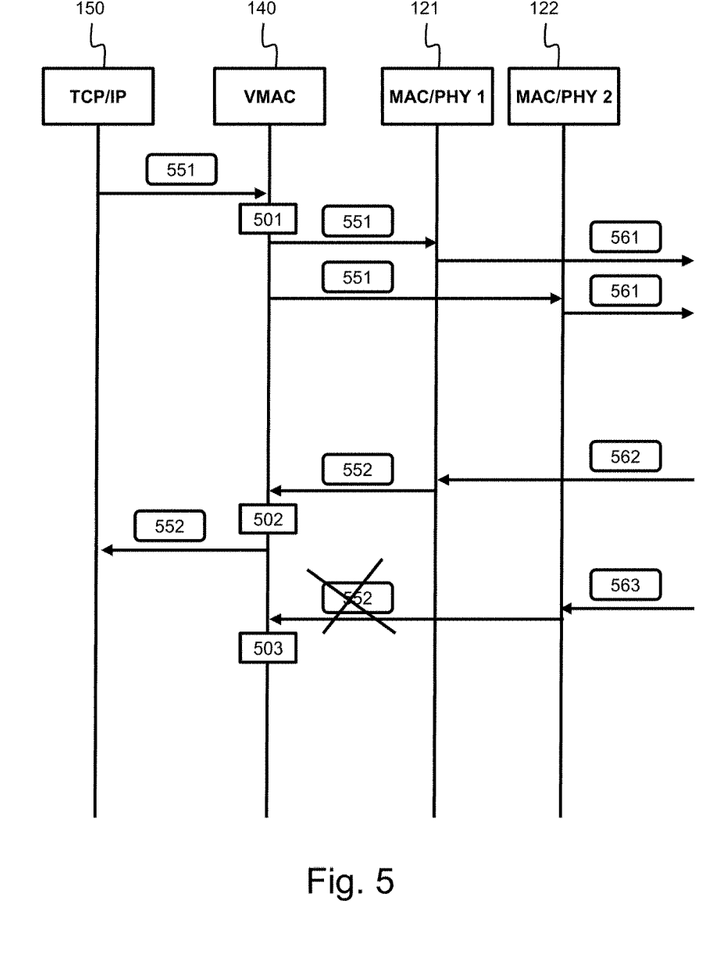
FIG. 5 illustrates steps performed by different layers of a network stack for removing replicated packets according to an embodiment of the invention.

FIG. 5 illustrates steps performed by abstraction layer 140 according to an embodiment of the invention. In addition or complementary to the different forwarding schemes as described with reference to FIG. 2 and FIG. 3, abstraction layer 140 may also implement a replication scheme in which packets 551 received from network layer 150 are replicated and thus copied over two or more of the physical communication interfaces 181, 182. This is illustrated in FIG. 5 where abstraction layer 140 replicates packet 551 under step 501 and forwards the two copies to both layers 121 and 122, which, on their turn send them as packets 561 over the two communication interfaces 181 and 182. This replication of packets may further be combined with the load balancing schemes and TDMA schemes described above.

The opposite case where replicated packets 562 and 563 are received over the different communication interfaces is also illustrated in FIG. 5. In step 502, abstraction layer 140 receives the first copy 552 of the packets and, under step 502, forwards it to network layer 150. Then, abstract layer 140 receives the second copy of the packet, identifies it as a replication and discards this second copy under step 503, i.e., the second copy of the packet is not forwarded to network layer 150.

Figure 6:
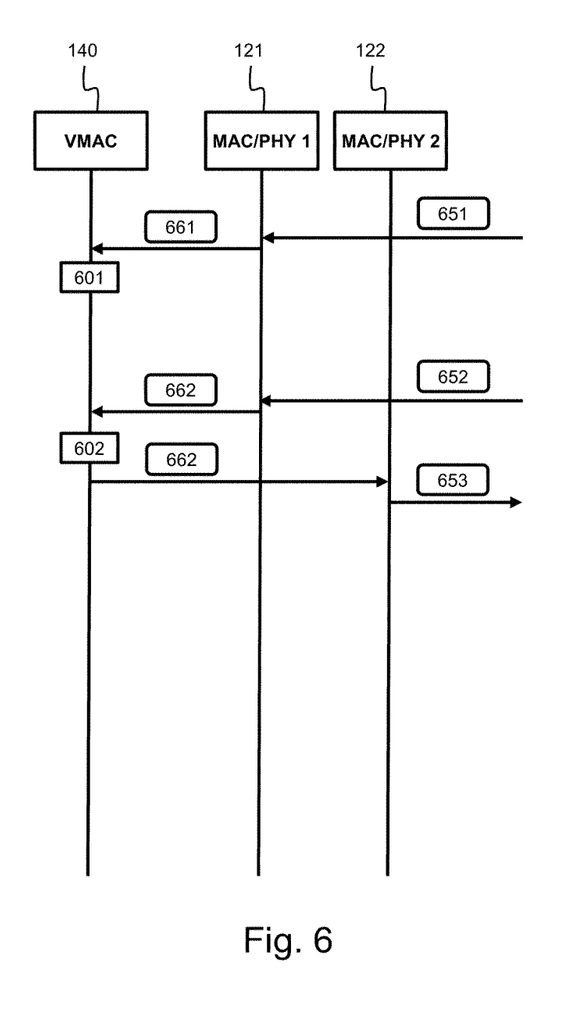
FIG. 6 illustrates steps performed by different layers of a network stack for performing multi-hop routing according to an embodiment of the invention.

FIG. 6 illustrates steps performed by abstraction layer 140 according to an embodiment of the invention. In this use case, abstraction layer serves as a routing layer for providing multi-hop capabilities. Abstraction layer 140 may then forward a received packet 662 from data link layer 121 to data link layer 122 under step 602. This way, an ad hoc network may be achieved over different communication technologies. The routing rules themselves may further be received from a remote communication device, for example an SDN controller. This is illustrated by the reception of the rules by packet 651 at the communication interface 181/121 and by packet 661 from the data link layer 121. The abstraction layer then applies the rules in step 601.

Figure 7:
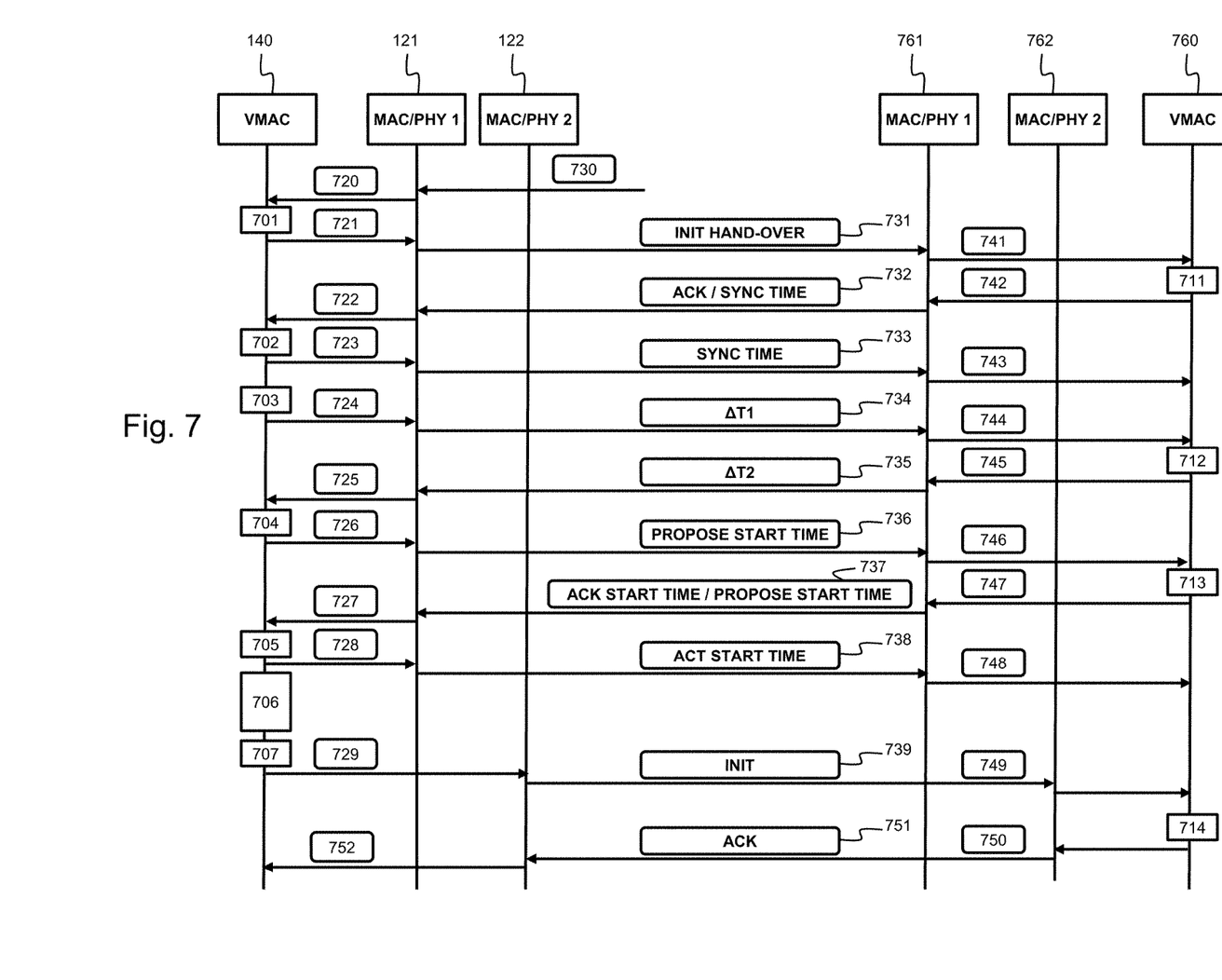
FIG. 7 illustrates steps performed by different layers of network stacks of two communication devices for performing a handover according to an embodiment of the invention.

FIG. 7 illustrates steps performed by two abstraction layers 140 and 760 in a respective first and second communication device, each device comprising a network stack 170 as described with reference to FIG. 1. The first device has an abstract data link layer 140 and data link layers 121 and 122 and the second device has an abstract data link layer 760 and data link layers 761 and 762. Layers 121 and 761 operate according to the same standard and can thus establish a first communication link between the two devices. Similarly, layers 122 and 762 operate according to the same standard and can thus establish a second communication link between the two devices. By the steps of FIG. 7, a handover will be established from the first communication link to the second communication link for the communication between the two devices.

The handover starts with the reception of a hand-over command 730 at communication interface 121 which is provided as packet 720 to abstraction layer 140. In step 701, abstraction layer 140 processes the handover command 730 and constructs a message to initiate the handover. This message is then sent to the second device over the first interface 121 by the respective packet 721, 731, 741. The abstraction layer 760 receives this message and then responds to it under step 711, by construction and sending a message to acknowledge the handover. Optionally, the message may further comprise time synchronization information to synchronize the internal clock of the first and second device. The message is then send to the first device by respective packet 742, 732, 722. Upon reception of the message by abstraction layer 140, it may optionally acknowledge the time synchronization by sending a response message under step 702 and by packet 723, 733, 743. Under step 703, abstraction layer 140 also constructs a message comprising the maximum amount of time needed by the first device to perform the handover. This message is then send to the second device by packet 724, 734, 744. Upon reception, abstraction layer 760 of the second device, responds under step 712 by constructing and sending a message with the maximum amount of time needed by the second device to perform the handover by the second device. This message is sent to the first device by respective packet 745, 735, 725. Under step 704, abstraction layer 140 constructs a message comprising a proposed starting time for the handover based on the synchronized clock between the two devices. This message is then sent to the second device by respective packet 726, 736, 746. Abstraction layer 760 has then two possibilities. A first possibility is to acknowledge the starting time under step 713. A second possibility is to propose another, later, starting time to the first device under step 713. Abstraction layer 760 then sends the acknowledgement or proposal to the first device by respective packet 747, 737, 727. When the proposal is acknowledged, abstraction layer 140 proceeds to step 706. When a later starting time is proposed, abstraction layer 140 acknowledges the later starting time to the second device by respective packet 728, 738, 748. Abstraction layer 140 then proceeds to step 706 wherein a countdown timer is started that will elapse after an amount of time that is at least the maximum of the maximum amount of time needed by the second device to perform the handover and the maximum amount of time needed by the first device to perform the handover. When the timer lapses, the abstraction layer proceeds to step 707 and constructs an initialization message. This message is then send by respective packets 729, 739, 749 over the second communication interface 122, 182 to the second communication interface 762 of the second device. After reception of the message, abstraction layer 760 of the second device acknowledges the initialization message under step 714 by respective packet 750, 751, 752. From that moment onwards, both devices communicate over the second communication interface and, thus, a handover is performed without loss of any packet and in the shortest amount of time. Moreover, this handover is performed invisibly for the higher network layer or application layer.

Figure 9:
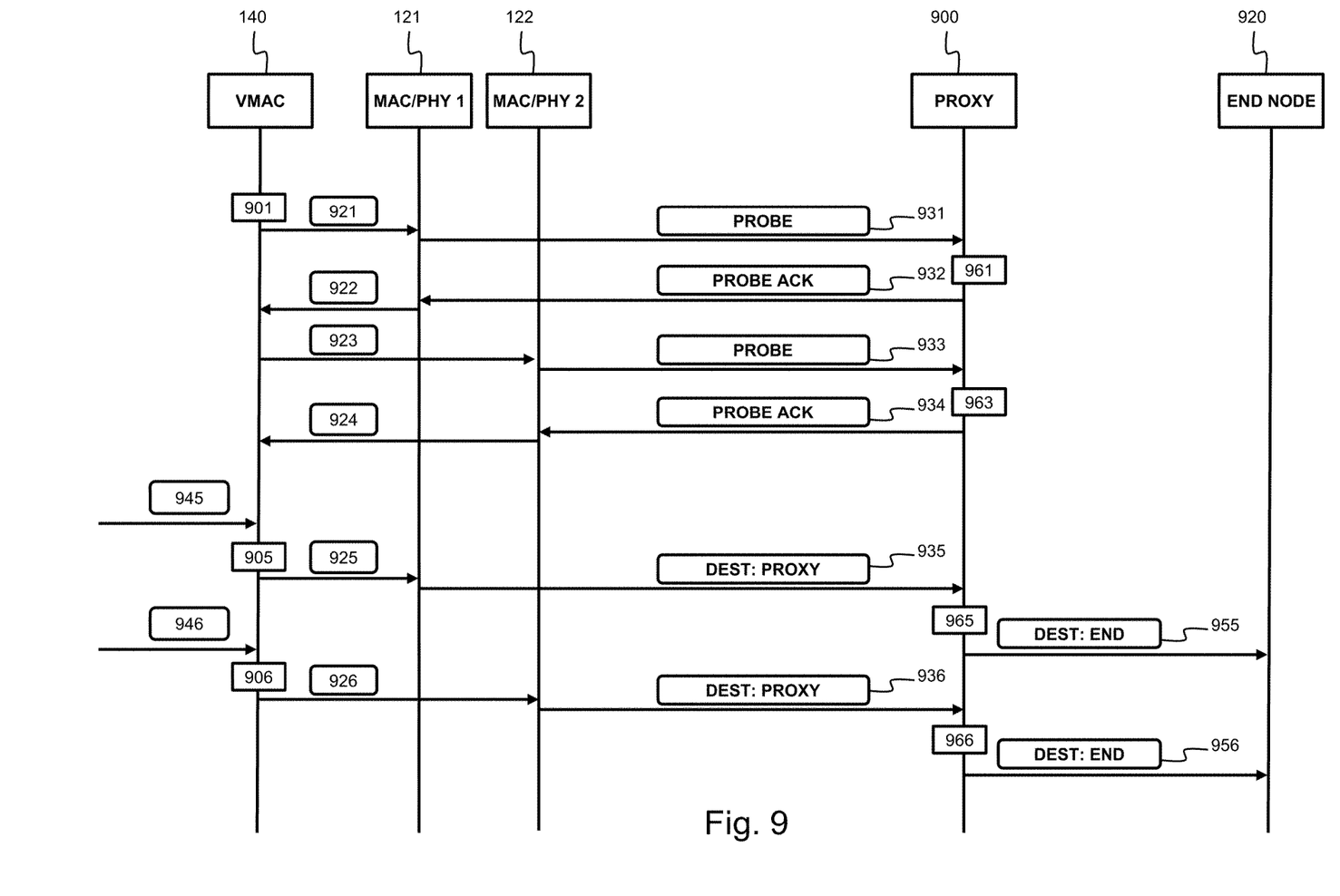
FIG. 9 illustrates steps performed by different layers of a network stack for sending network packets to an end node over an intermediate proxying service.

FIG. 9 illustrates steps performed by the abstraction layer 140 of communication device 100 according to an example embodiment of the invention. Communication interfaces 121, 122 are both connected to a communication network. The communication network may be a private or public Wide Area Network such as for example the Internet. The communication network further comprises an addressable proxying service 900, i.e. a service which is addressable by a network address. The proxying service 900 is configured to interoperate with the device 100, more specifically with the abstraction layer 140. During operation, the abstraction layer 140 receives networking packets 945, 946 from upper layers which are destined for a destination end node 920 within the communication network. The abstraction layer then alters, in steps 905, 906 the destination address of the networking packets to the network address of the proxying service 900 and forwards the altered packets 925, 926 over either one of physical interfaces 121, 122 according to any of the neutral packet distribution scheme as described above. The forwarded packets 935, 936 are then received by the proxying service 900, which, on its turn, relays the packets to the end node 920 by, in respective steps 965, 966, adding the networking address of end node 920 as destination address to the packets and adding the networking address of the proxying node 900 as source address to packets 955, 956. The end node 920 may then transmit packets to device 100 in a similar but reverse way. As a result, the abstraction layer 140 provides a single networking interface to the upper layers of device 100 while providing multiple paths up to the proxying service 900. Furthermore, the end node 920 will experience a single network connection from proxying service 900 by a single networking interface. Therefore, the multiple paths between the device 100 and proxying service 900 remain invisible to the end node 920. Moreover, the end node 920 does not need to support any of the abstraction layer logic.

In order to ensure a good operation with the proxying service 900, an initializing phase 901 may be conducted prior to the above described operation. The initializing phase may comprise the sending, by the abstraction layer, of probing packets 921, 931 and 923, 963 to the proxying service 900. To this purpose, abstraction layer 140 may have obtained the networking address of the proxying service 900, e.g. by configuration. To ensure that network communication is possible with the proxying service over either one of the physical interfaces 121, 122, the probing packet are sent over each of the candidate physical interfaces. Then, in respective steps 961, 963, the proxying service 900 acknowledges the probing packets 931, 933 by sending acknowledging packets 932, 934 to the respective interfaces 121, 122 of device 100. The initialization phase 901 may comprise the further exchange of control messages, e.g., to establish a three-way handshaking mechanism with the proxying service 900. Preferably, the initialization is performed for each transport layer mechanism to ensure reliable operation over each of the transport layer protocols.

Device 100 operating according to the steps of FIG. 9 may further be configured to operate as a gateway between the communication network and another communication network, e.g., a private communication network. To this purpose, device 100 may comprise at least one other physical interface connected to the private communication network.

To relay the packets by the proxying service 900, the service 900 has knowledge of the network address of the end node 920. This network address is provided by the abstraction layer 140 to the proxying service 900. The address may for example be provided by embedding the address in another field than the destination address field of the networking packets 935, 936. Alternatively, the address of end node 920 may be provided during the initialization phase 901 or by any other control message between the abstraction layer 140 and the proxying service 900.

Figure 8:
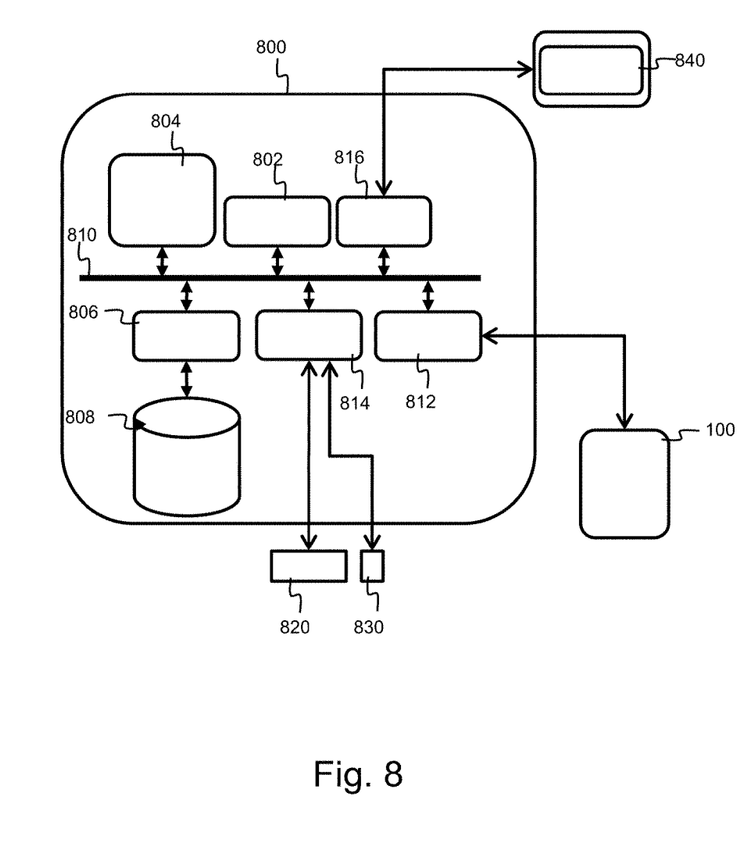
FIG. 8 illustrates a suitable computing system for performing the steps according to various embodiments of the invention.

FIG. 8 shows a suitable computing system 800 for performing the steps according to the above embodiments. Computing system 800 may be used as communication device 100 and, thus, comprise networking stack 170. Computing system 800 may in general be formed as a suitable general purpose computer and comprise a bus 810, a processor 802, a local memory 804, one or more optional input interfaces 814, one or more optional output interfaces 816, a communication interface 812, a storage element interface 806 and one or more storage elements 808. Bus 810 may comprise one or more conductors that permit communication among the components of the computing system 800. Processor 802 may include any type of conventional processor or microprocessor that interprets and executes programming instructions. Local memory 804 may include a random access memory (RAM) or another type of dynamic storage device that stores information and instructions for execution by processor 802 and/or a read only memory (ROM) or another type of static storage device that stores static information and instructions for use by processor 802. Input interface 814 may comprise one or more conventional mechanisms that permit an operator to input information to the computing device 800, such as a keyboard 820, a mouse 830, a pen, voice recognition and/or biometric mechanisms, etc. Output interface 816 may comprise one or more conventional mechanisms that output information to the operator, such as a display 840, etc. Communication interface 812 may comprise any transceiver-like mechanism such as for example one or more Ethernet interfaces that enables computing system 800 to communicate with other devices and/or systems. Communication interface 812 may comprise communication interfaces 181, 182, 183, physical layers 101, 102, 103 and/or MAC layers 121, 122, 123. The communication interface 812 of computing system 800 may be connected to such another computing system by means of a local area network (LAN) or a wide area network (WAN) such as for example the internet. Storage element interface 806 may comprise a storage interface such as for example a Serial Advanced Technology Attachment (SATA) interface or a Small Computer System Interface (SCSI) for connecting bus 810 to one or more storage elements 808, such as one or more local disks, for example SATA disk drives, and control the reading and writing of data to and/or from these storage elements 808. Although the storage elements 808 above is described as a local disk, in general any other suitable computer-readable media such as a removable magnetic disk, optical storage media such as a CD or DVD, -ROM disk, solid state drives, flash memory cards, . . . could be used. The system 800 described above can also run as a virtual machine above the physical hardware.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for providing network access by a network stack in a communication device comprising a plurality of physical communication interfaces, wherein, for each physical communication interface, the network stack comprises a data link layer for the exchange of data frames with remote communication devices and a data link layer interface for exchanging data of data frames between the data link layer and higher layers in the network stack, the method comprising:
providing an abstraction data link layer operable with each data link layer and comprising a single abstracted data link layer interface such that the plurality of physical communication interfaces appear as a single data link layer interface to the higher layers; and
obtaining network packets from the higher layers and distributing the network packets over the plurality of physical communication interfaces according to a neutral packet distribution scheme;
wherein the method further comprises,
by the abstraction data link layer:
receiving a handover command from a remote network controller for performing a handover from a first physical communication interface of the plurality of physical communication interfaces to a second physical communication interface of the plurality of physical communication interfaces between the communication device and a second remote communication device;

sending a first minimum amount of time for performing the handover to the second remote communication device;

receiving from the second remote communication device a second minimum amount of time for performing the handover by the second remote communication device;

performing the handover; and after at least the largest of the first minimum amount of time and the second minimum amount of time, resuming communication with the second remote communication device over the second physical communication interface.

2. The method according to claim 1, wherein the packet neutral distribution scheme corresponds to a probabilistic load balancing scheme.

3. The method according to claim 1, wherein the packet neutral distribution scheme corresponds to a time division multiple access scheme.

4. The method according to claim 3, wherein the plurality of physical communication interfaces comprises at least two wireless communication interfaces sharing a same wireless communication channel; and wherein the distributing further comprises:

distributing network packets obtained from the higher layers over the at least two wireless communication interfaces according to the time division multiple access scheme.

5. The method according to claim 1, further comprising, by the abstraction data link layer:

receiving the packet neutral distribution scheme from a remote network controller.

6. The method according to claim 1, further comprising, by the abstraction data link layer:

receiving packets from a remote communication device over the plurality of physical communication interfaces; and reordering the packets to an initial packet sequence; and providing the reordered packets to the higher layers.

7. The method according to claim 1, wherein the packet neutral distribution scheme further comprises a packet replication scheme; and wherein the method further comprises, by the abstraction data link layer:

replicating all network packets from the higher layers over at least two of the plurality of physical communication interfaces.

8. The method according to claim 1, further comprising, by the abstraction data link layer:

receiving a replicated frame from one of the plurality of physical communication interfaces; and identifying the replicated frame as a replication of a previously received frame;

removing the replicated frame.

9. The method according to claim 1, wherein the plurality of physical communication interfaces are connected to a communication network comprising an addressable proxying service; and wherein the method further comprises, by the abstraction data link layer:

replacing the destination address of the network packets by a network address of the proxying service; and sending the network packets to the proxying service for further relaying to a destination node by the further distributing the network packets over the plurality of physical communication interfaces according to the neutral packet distribution scheme.

10. The method according to claim 9, further comprising, by the abstraction data link layer:

initializing, for a transport layer protocol of the network packets, over the respective physical communication interfaces, an intermediate connection with the proxying service; and providing the destination address of the network packets to the proxying service for the further relaying of the packets to a destination node.

11. The method according to claim 10, wherein the providing is performed by incorporating the destination address of the destination node in a field of the network packets different than the destination address field.

12. The method according to claim 10, wherein the providing is performed by sending the address of the public end node to the proxying service prior to the sending of the network packets.

13. The method according to claim 1, further comprising, by the abstraction data link layer:

receiving a packet from a first one of the plurality of physical communication interfaces; and routing the packet from the first one of the plurality of physical communication interfaces to a second one of the plurality of physical communication interfaces according to a multi-hop routing table.

14. The method according to claim 13, further comprising, by the abstraction data link layer:

receiving the multi-hop routing table from a remote network controller.

15. The method according to claim 1, further comprising, by the abstraction data link layer:

negotiating with the second remote communication device on a starting time for the handover; and performing the handover on the starting time.

16. A computer program product comprising computer-executable instructions for performing the method according to claim 1 when the program is run on a computer.

17. A computer readable storage medium having stored thereon executable instructions that when executed by the one or more processors configure a computing system to perform the following for providing network access by a network stack in a communication device comprising a plurality of physical communication interfaces, wherein, for each physical communication interface, the network stack comprises a data link layer for the exchange of data frames with remote communication devices and a data link layer interface for exchanging data of data frames between the data link layer and higher layers in the network stack:

provide an abstraction data link layer operable with each data link layer and comprising a single abstracted data link layer interface such that the plurality of physical communication interfaces appear as a single data link layer interface to the higher layers; and obtain network packets from the higher layers and distributing the network packets over the plurality of physical communication interfaces according to a neutral packet distribution scheme; and by the abstraction data link layer:

receiving a handover command from a remote network controller for performing a handover from a first physical communication interface of the plurality of physical communication interfaces to a second physical communication interface of the plurality of physical communication interfaces between the communication device and a second remote communication device;

sending a first minimum amount of time for performing the handover to the second remote communication device;
receiving from the second remote communication device a second minimum amount of time for performing the handover by the second remote communication device;
performing the handover; and
after at least the largest of the first minimum amount of time and the second minimum amount of time, resuming communication with the second remote communication device over the second physical communication interface.

18. A computing system comprising:
one or more processors; and
a memory storage,
wherein the memory storage has stored thereon executable instructions that when executed by the one or more processors configure the computing system to perform the following for providing network access by a network stack in a communication device comprising a plurality of physical communication interfaces, wherein, for each physical communication interface, the network stack comprises a data link layer for the exchange of data frames with remote communication devices and a data link layer interface for exchanging data of data frames between the data link layer and higher layers in the network stack,
provide an abstraction data link layer operable with each data link layer and comprising a single abstracted data link layer interface such that the plurality of physical communication interfaces appear as a single data link layer interface to the higher layers; and
obtain network packets from the higher layers and distributing the network packets over the plurality of physical communication interfaces according to a neutral packet distribution scheme; and
by the abstraction data link layer:
receiving a handover command from a remote network controller for performing a handover from a first physical communication interface of the plurality of physical communication interfaces to a second physical communication interface of the plurality of physical communication interfaces between the communication device and a second remote communication device;
sending a first minimum amount of time for performing the handover to the second remote communication device;
receiving from the second remote communication device a second minimum amount of time for performing the handover by the second remote communication device;
performing the handover; and
after at least the largest of the first minimum amount of time and the second minimum amount of time, resuming communication with the second remote communication device over the second physical communication interface.

* * * * *